(12) United States Patent
Helland et al.

(10) Patent No.: US 10,691,696 B2
(45) Date of Patent: Jun. 23, 2020

(54) KEY-VALUE STORAGE USING A SKIP LIST

(71) Applicant: salesforce.com, inc., San Francisco, CA (US)

(72) Inventors: Patrick James Helland, San Francisco, CA (US); James E. Mace, San Francisco, CA (US); Thomas Fanghaenel, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 287 days.

(21) Appl. No.: 15/420,342

(22) Filed: Jan. 31, 2017

(65) Prior Publication Data

US 2018/0217987 A1    Aug. 2, 2018

(51) Int. Cl.
   *G06F 16/2455*    (2019.01)
(52) U.S. Cl.
   CPC .............. *G06F 16/24562* (2019.01)
(58) Field of Classification Search
   CPC .................................................. G06F 17/30504
   See application file for complete search history.

(56) References Cited

U.S. PATENT DOCUMENTS

| | | | |
|---|---|---|---|
| 5,276,868 A | 1/1994 | Poole | |
| 5,664,179 A | 9/1997 | Tucker | |
| 6,665,682 B1 | 12/2003 | DeKimpe et al. | |
| 7,257,711 B2 | 8/2007 | Goodrich et al. | |
| 8,332,420 B2 | 12/2012 | Kaiser | |
| 2003/0041280 A1* | 2/2003 | Malcolm | G06F 11/1435 714/4.2 |
| 2003/0204698 A1 | 10/2003 | Sachedina et al. | |
| 2004/0107346 A1* | 6/2004 | Goodrich | H04L 9/3236 713/176 |
| 2007/0124313 A1 | 5/2007 | Kim et al. | |
| 2008/0021908 A1* | 1/2008 | Trask | G06F 17/30949 |
| 2008/0086501 A1 | 4/2008 | Levine | |
| 2009/0132563 A1 | 5/2009 | Herlihy et al. | |
| 2011/0252000 A1 | 10/2011 | Diaconu et al. | |
| 2013/0173908 A1* | 7/2013 | Matthews | H04L 45/7453 713/153 |
| 2016/0044143 A1 | 2/2016 | Narasimhamurthy | |
| 2016/0350006 A1 | 12/2016 | Wang et al. | |

* cited by examiner

*Primary Examiner* — Hosain T Alam
*Assistant Examiner* — Anthony G Gemignani
(74) *Attorney, Agent, or Firm* — Kowert, Hood, Munyon, Rankin & Goetzel, P.C.

(57) ABSTRACT

This disclosure provides various techniques that may allow for accessing values stored in a data structure that stores multiple values corresponding to database transactions using a skip list. A key may be used to traverse the skip list to access data associated with the key. The skip list maintains on ordering of multiple keys, each associated with a particular record in the data structure, using indirect links between data records in the data structure that reference buckets included in hash table. Each bucket includes pointers to one or more records in the skip list.

15 Claims, 9 Drawing Sheets

US 10,691,696 B2

KEY-VALUE STORAGE USING A SKIP LIST

BACKGROUND

Technical Field

This disclosure relates to data storage, in particular to multi-version key-value storage using a skip list.

Description of the Related Art

Computer systems may include multiple computers, workstations, servers, and storage systems, each performing different tasks. For example, in some computer systems, a particular computer may be executing software for managing e-mail messages, while other workstations, in the computer systems, may be used for word processing, web browsing, database storage, and the like.

Databases are a common method for organizing stored data in computer systems. Some databases can be queried with various keys, values of the keys, etc. in order to access particular data in the database that is associated with the key. During operation of a computer system, multiple requestors generate requests to access a database. Such requests may include a request for retrieval of one or more particular records, the storage of a new record, or the removal of a previously stored record from the database.

A computer executing a software program to manage the database may schedule the various requests for access to the database according to one of various algorithms. During the execution of a particular request, the computer may traverse the database to retrieve or delete a desired record, or determine an appropriate location in which to add a new record.

Figure 1:
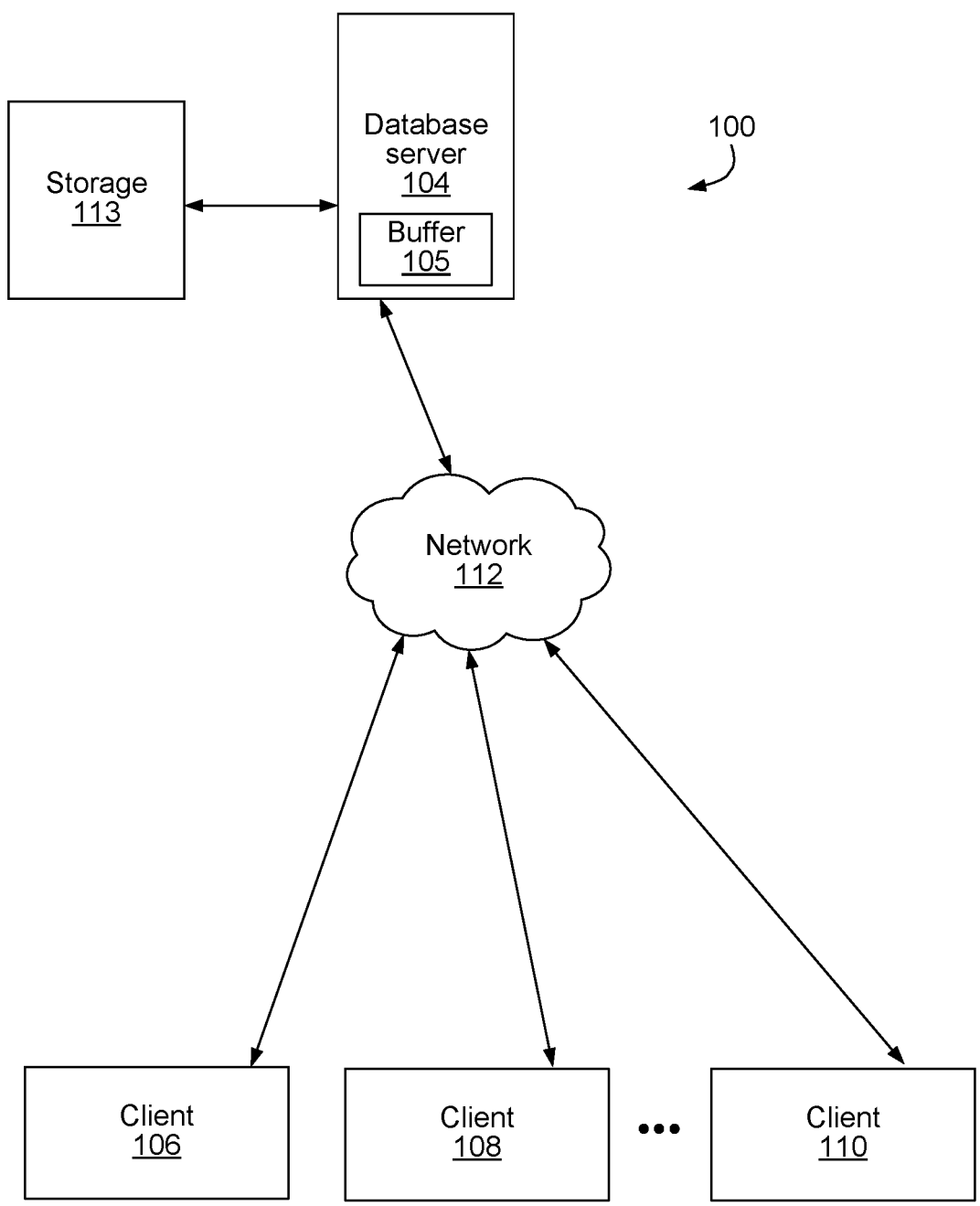
FIG. 1 is a block diagram illustrating an embodiment of a database and various database clients.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

Moreover, the term "based on" as used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but it does not foreclose the determination of A from also being based on C. In other instances, A may be determined based solely on B.

DETAILED DESCRIPTION OF EMBODIMENTS

Databases may use different data structures for storing and accessing data. In some cases, one or more data values may be associated with a particular key prior to storage. Once stored, the one or more data values may be retrieved using the particular key. To facilitate access to information stored in this fashion, the stored data values may be sorted by the values of the various keys (commonly referred to as "key-sorted order"). As used and described herein a key is a portion of a key-value pair used for identification purposes.

To organize stored data values in key-sorted order, a type of data structure referred to as a "skip list" may be employed. As used and described herein, a skip list refers to a data structure that includes a linked hierarchy of sequences of data records, with each successive sequence skipping over fewer elements than the previous sequence. Such structures may be implemented using records including stacks of pointers to successor records that make use of the property that, on average, the pointers on a N+1th level of the stacks will skip over twice as many records as pointers on the Nth level of the stacks. In some skip lists, the links between records may be implemented using native machine pointers.

In many computer systems, a fixed amount of storage space may be allocated to store a database. In such cases, when a record in the database is removed, other records may be relocated in a process called defragmentation, to provide contiguous storage space for new entries. During the defragmentation, pointers referencing a particular record that has been relocated are updated to reflect the new location of the particular record. In large skip lists, updating the pointers may involve a long period of time, during which, access to the skip list may be limited. The embodiments illustrated in the drawings and described below may ameliorate these issues, for example by providing techniques for storing key-value pairs while minimizing the impact on access to a skip list during record relocation operations.

It should be noted that various elements of this disclosure that are shown in the figures or described in the text may be used in conjunction with any of the computer systems, servers, mobile devices, other apparatuses, elements, or components disclosed herein or known in the art, among other systems. In various embodiments, some of the elements of process flows shown may be performed concurrently instead of sequentially, or in a different order than shown, or may even be omitted altogether in some cases. Additional process flow elements that are not shown may also be performed as appropriate or desired. In some embodiments, different elements of process flows may be performed by the same system or different systems.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

Turning now to FIG. 1, a block diagram of a system 100 is shown. In the system 100, a network 112 may represent the Internet, an intranet, or any other suitable type of computer network. The network 112 may couple a database server (also referred to as a "database system" or "database computer system") 104 to one or more clients 106, 108, and 110.

In some embodiments, the database server 104 may be embodied in one or more physical computer system(s). Various types of data may be stored on database server 104, using a particular one of various data structures. For example, as described below, in more detail, data may be stored on database server 104 using a skip list or any other suitable data structure. The database server 104 may be, in some embodiments, a cloud-based system providing software operation for users on clients 106, 108, and/or 110. For example, the database server 104 may be part of a software as a service (SaaS) model. Alternatively, a user may directly operate the database server 104.

Database server 104 includes buffer 105, and is coupled to storage 113, which may include any suitable type of long-term persistent data storage system. During operation, database server 104 may temporarily store pending and recently committed database transactions in buffer 105. As described below in more detail, database server 104 uses a key associated with the desired transaction to access a data structure in buffer 105 storing values for the database transactions. In various embodiments, the key associated with the desired transaction, may be used to traverse a skip list, which maintains an ordering of keys associated with the database transactions.

Clients 106, 108, and 110 may each include one or more computer systems, executing one or more software programs or applications. Each of clients 106, 108, and 110 may be a database requestor, and may be configured to issue database queries to the database server 104. Multiple queries and other database accesses from a client 106, 108, or 110 may form a transaction. The components of the transaction either complete successfully as a unit on consistent data from underlying database entries, or are rolled back and retried if the data changes due to interference from a different transaction. Generally, when two transactions conflict, the database server 104 may select a transaction to roll back and may permit the other transaction to commit, finalizing its changes to the database. Rolling back a transaction may refer to removing any changes the transaction attempted to make to the database. The transaction may be reattempted from the start, or abandoned, at the discretion of the database requestor.

It is noted that the system depicted in FIG. 1 is merely an example. In other embodiments, different numbers of clients and different numbers of databases maybe employed.

Figure 2:
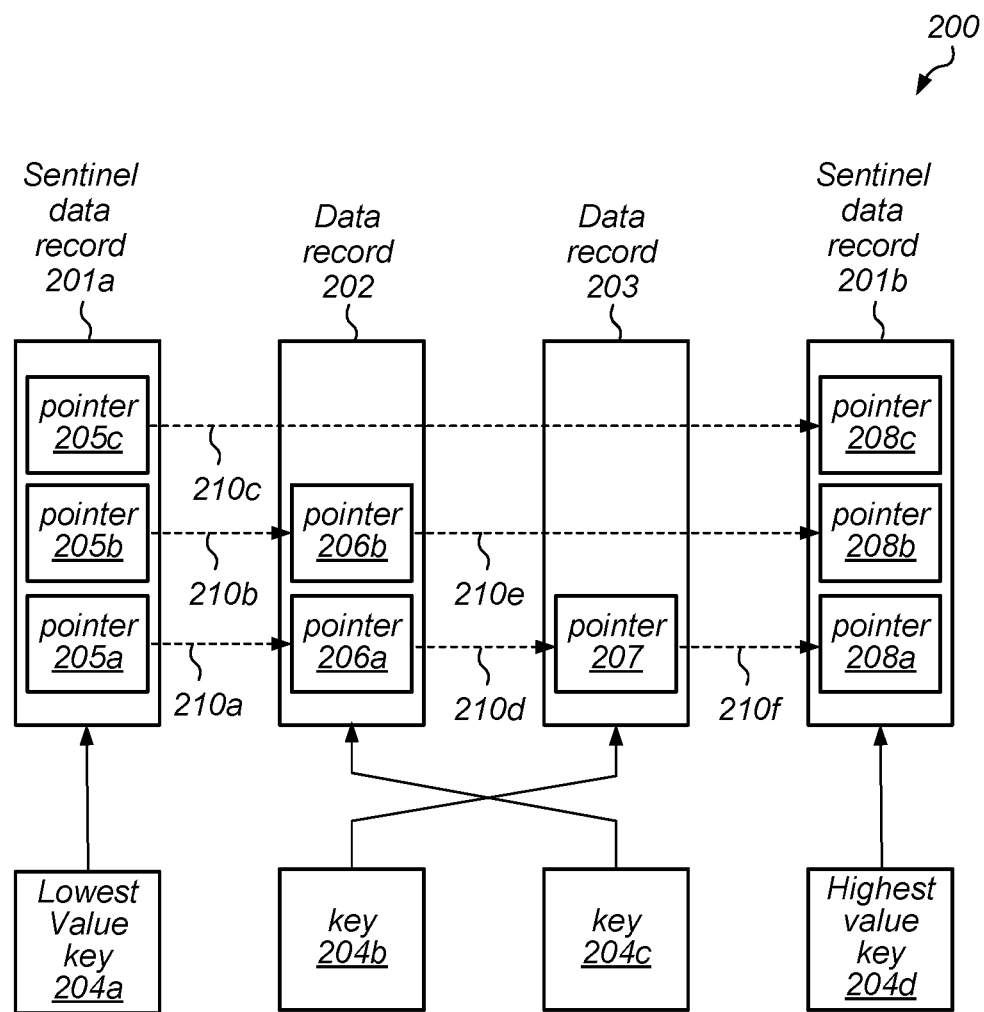
FIG. 2 is a block diagram depicting an embodiment of a skip list employing indirect links.

To facilitate the addition, removal, or relocation of data included in the data structure storing pending database transactions, a skip list may be employed to link the various data records together, preserving an order of keys associated with the values stored in the data records. In various embodiments, the data stored in the data structure that is associated with a particular key may correspond to data for a particular row included in a database. Such data is commonly referred to as "row data." An embodiment of a skip list using indirect links is depicted in FIG. 2.

In the illustrated embodiment, skip list 200 includes sentinel data records 201a and 201b, as well as data records 202 and 203. As further illustrated, sentinel data record 201a includes pointers 205a-c, sentinel data record 201b includes pointers 208a-c, data record 202 includes pointers 206a and 206b, and data record 203 includes pointer 207. Sentinel data records 201a and 201b correspond to the lowest value key 204a and highest value key 204d, respectively. Data record 202 corresponds to key 204c, and data record 203 corresponds to key 204b. It is noted that the data records may not be stored in the same order as the keys. As depicted in FIG. 2, key 204c is lexicographically smaller than key 204b. By accessing the data records using the indirect links in the data records and the associated keys, data may be accessed in key-sorted order. In some embodiments, sentinel data records are used to determine where to start traversing a skip list, or when traversal of a skip list has been completed.

Each of the above mentioned data records includes one or more pointers, each of which correspond to a particular level of the skip list. Each pointer represents an indirect link to a pointer in another data record. As described below in more detail, a particular pointer may reference a location in memory, which stores another pointer to the target location. For example, pointer 205a included in sentinel data record 201a indirectly links to pointer 206a in data records 202, which, in turn, indirectly links to pointer 207 included in data record 203. It is noted that in addition to pointers, each of data records 202 and 203 may include other data such as, e.g., a value associated with a key as part of a key-value pair, or any other suitable data. Although, in the illustrated embodiments, the indirect links are shown as propagating in a particular direction, in other embodiments, bi-directional indirect links may be employed allowing for traversal of the skip list in either direction.

As noted above, each pointer in a particular data structure may correspond to a particular level of the skip list. In various embodiments, the number of data record pointers to skip at each higher level in the skip list may be determined in a probabilistic or any other suitable fashion. Although only four levels are illustrated in the embodiment depicted in FIG. 2, in other embodiments, any suitable number of levels may be employed.

Although only two data records, with two associated keys, are depicted in the block diagram of FIG. 2, in other embodiments, any suitable number of data records and keys may be employed.

Figure 3:
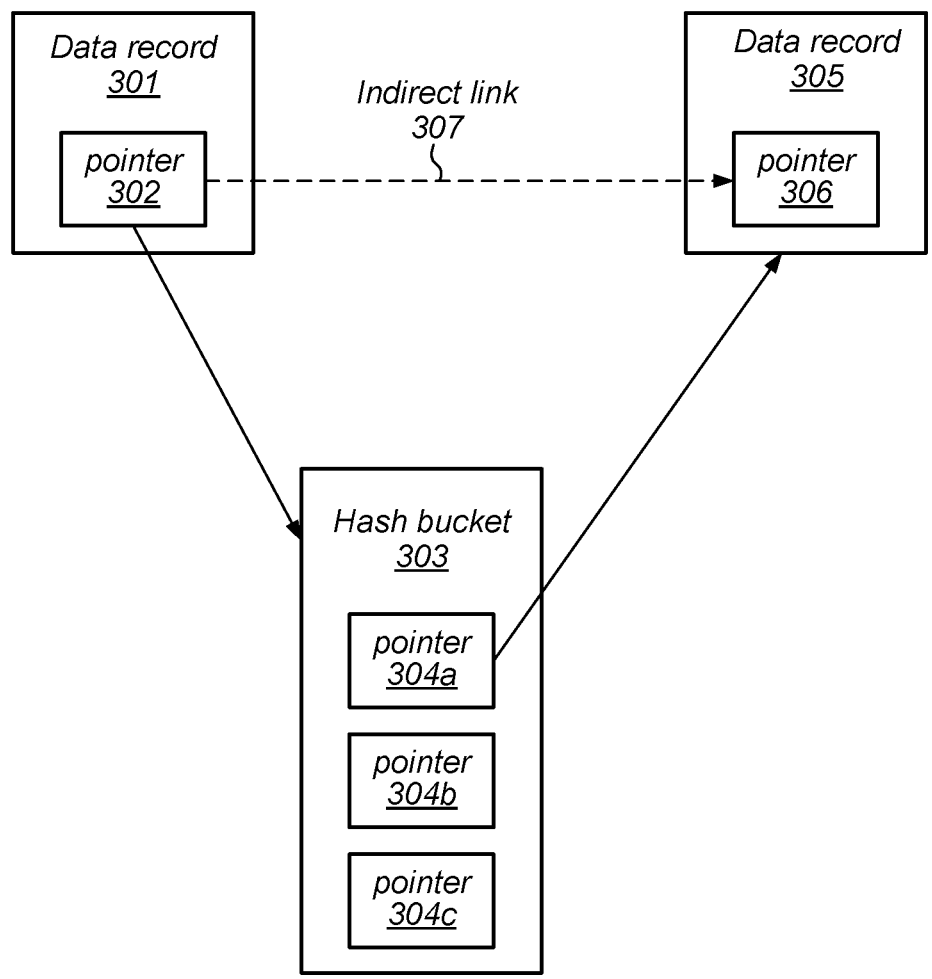
FIG. 3 is a block diagram of an embodiment of an indirect link.

A block diagram depicting an indirect link is illustrated in FIG. 3. In the illustrated embodiment, data record 301 includes a pointer 302, which is linked via indirect link 307 to pointer 306 in data record 305. In various embodiments, indirect link 307 may correspond to any of indirect links 210a-f as illustrated in FIG. 2.

As noted above, when employing indirect links, a pointer from one data records points to a pointer in another data record via a third location in memory. In the present embodiment, pointer 302 actually points to hash bucket 303, which may be included with other hash buckets in a hash table. As used and described herein, a hash bucket (or simply a "bucket") is a collection of data items stored in memory that are associated with a common hash value. In various embodiments, a particular hash bucket may include an identifier (referred to herein as a "bucket identifier") that may be used to identify one hash bucket from another. A bucket identifier, as used and described herein, includes any suitable information to data used to identify the an associated bucket. It is noted that in some cases, different keys may generate a common hash value, in which case, a bucket may be associated with more than one key.

A hash bucket may be associated with multiple data records depending on a value of respective keys associated with the data records. Depending on a type of hash algorithm employed, multiple keys may be associated with a given hash bucket, and pointers for the data records associated with the multiple keys may be included in the hash bucket. As described below in more detail, during traversal of a skip list, selection of a particular pointer from the multiple pointers included in a given hash bucket may depend on the key values associated with the data records whose pointers are stored in the hash bucket.

In the present embodiment, pointer 302 links to hash bucket 303, which includes pointers 304a-c. For the purposes of illustration, it is assumed that pointer 304a is the pointer of interest. Pointer 304a links to data record 305, thereby indirectly linking data record 301 to data record 305 via hash bucket 303. It is noted that hash bucket 303 is merely an example. In other embodiments, hash bucket 303 may include different numbers of pointers, as well as other data, such as, data for detecting corruption of the hash bucket, data indicating that the hash bucket is locked or latched, or any other suitable combination of data.

During the operation of database server 104, data records stored in buffer 105 may be deleted or relocated, or new data records may be added. In such cases, links included in the skip list associated with the data records are typically updated. For example, in a situation when a particular data record is removed from the data structure, links at each level of the associated skip list would be updated. Predecessors to the particular data record would be pointed to a new successor data records to reflect the removal of the particular data record. Reverse pointers in successor data records would be similarly modified to point to new predecessor data records. Such pointer modification can be costly in terms of time and computing resources.

In contrast, when using indirect links, only data record pointers included in a few hash buckets need to be modified. By linking pointers in such a fashion, the effects on the links in a skip list may be minimized during the relocation, addition, and deletion of records included in the data structure.

It is noted that the embodiment depicted in the block diagram of FIG. 3 is merely an example. In other embodiments, different numbers of pointers, and different arrangements of pointers may be employed.

When a database server, such as, e.g., database server 104 receives a request for access to a database, the database server may perform a series of operations in order to find the desired record, or to find a location in which to insert a new record in buffer 105. An embodiment of method for processing such requests is depicted in the flow diagram of FIG. 4. The method begins in block 401.

A key for an active database transaction may then be received (block 402). It is noted that the database server may generate the key based on received data and/or other information. In various embodiments, the key may be associated with a value previously stored in a data record in buffer 105. Alternatively, the key may be part of a new key-value pair that is to be stored in the database. In some embodiments, the key may be used to generate a hash value, which may be used to select a particular hash bucket. The hash value may be generated according to any suitable hash algorithm.

A skip list may then be traversed using the received key (block 403). As described below in more detail, the skip list may be integrated with the records included in the data structure storing the values for pending data transactions in buffer 105. In some embodiments, the links between the records in the data structure that form the skip list may be indirect links (also referred to as "soft links").

Once the skip list has been traversed, results of the traversal may then be used to access the value corresponding to the received key in the data structure (block 404). In some embodiments, the accessed value may be stored in persistent storage, such as, storage 113, for example. Alternatively, the accessed value may be stored in buffer 105. In other embodiments, the value may be removed, i.e., deleted from the data structure in buffer 105. The method may then conclude in block 405.

Figure 4:
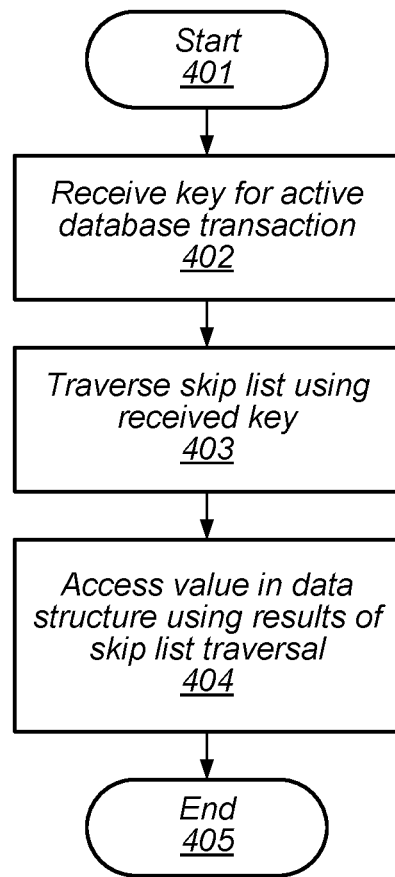
FIG. 4 is a flow diagram depicting an embodiment of a method for accessing a record stored using a skip list data structure.

It is noted that the embodiment of the method illustrated in FIG. 4 is merely an example. In other embodiments, different operations and different orders of operations are possible and contemplated.

As described above, part of accessing the data structure storing values for pending database transaction, a skip list may be traversed. An embodiment of a method for traversing a skip list is depicted in the flow diagram of FIG. 5. In the illustrated embodiment, the method may correspond to block 403 of the flow diagram depicted in FIG. 4. The method begins in block 501.

An initial level of a skip list, such as, e.g., skip list 200, may then be selected (block 502). In various embodiments, the highest level of skip list 500 may be selected. Once a level has been selected, the selected level of the skip list may then be traversed (block 503). As described below in more detail, traversal of the skip list may include latching different buckets within the skip list and examining successor and predecessor pointers included in the latched bucket.

During the traversal of the selected level of the skip list predecessor and successor arrays are populated (block 504). The predecessor array may include identifiers associated with buckets that include links to the desired key, and the successor array may include identifiers for buckets to which, the bucket corresponding to the desired key has links. The operation then depends upon whether the currently selected level of the skip list is the last level of the skip list (block 505).

If additional levels of the skip list remain to be traversed, then a new level is selected (block 506), and the method may proceed from block 503 as described above. Alternatively, if no further levels of the skip list remain, the operation may then conclude in block 507.

Figure 5:
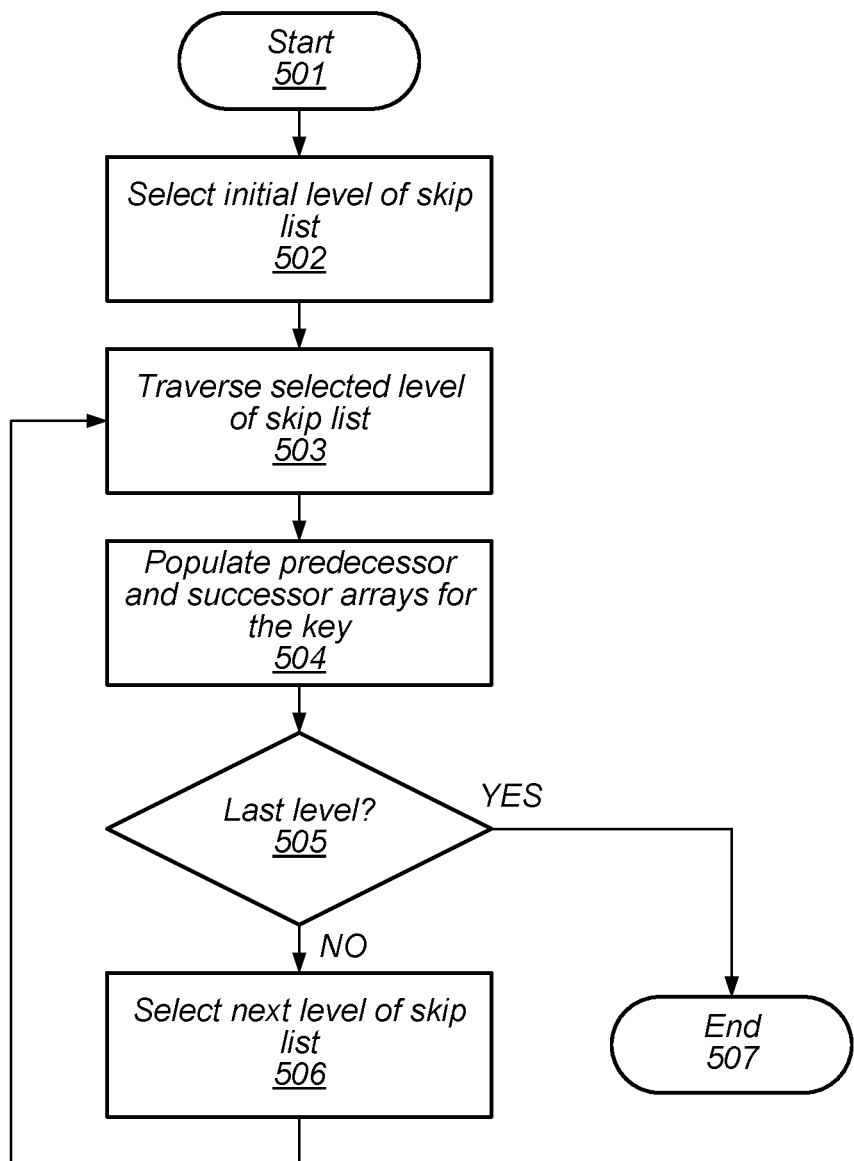
FIG. 5 is a flow diagram depicting an embodiment of a method for traversing a skip list.

It is noted that the embodiment of the method depicted in the flow diagram of FIG. 5 is merely an example. In other embodiments, different operations and different orders of operations may be employed.

When traversing a skip list, each level of the skip list may be traversed separately. An embodiment of a method for traversing a skip list level is depicted in the flow diagram of FIG. 6. In various embodiments, the method illustrated in the flow diagram of FIG. 6 may correspond to block 503 of the method depicted in the flow diagram of FIG. 5. The method begins in block 601.

A bucket corresponding to a particular key or the left sentinel record may then be latched (block 602). In various embodiments, when the bucket is latched, the contents of the bucket may not be updated. A particular value may be written into a particular data field included in the bucket to indicate that the bucket is current latched.

A link level of the skip list to be traversed may then be selected, and a target bucket identifier (ID) may then be determined based on the pointers of the latched bucket, i.e., the source bucket (block 603). The operation may then depend on a comparison of the IDs of the target bucket and the source bucket (block 604). If the ID of the target bucket is greater than the ID of the source bucket, then the target bucket may be latched (block 612), and the method may continue from block 609 as described below.

Alternatively, if the ID of the target bucket is not greater than the ID of the source bucket, then a record associated with the source bucket may be held and the latch on the source bucket may be released (block 605). In various embodiments, when the record is held, updates may still be made to the record and the source bucket. The target bucket is latched, followed by the source bucket (block 606). In the interim, changes may have occurred to the data structure, so the operation may then depend on the existences of the key associated with the source bucket, i.e., the source key (block 607).

If the source key no longer exists, then the latches are dropped and a new lookup is performed to find the closest successor to the source key (block 614). The method may then continue in block 610, as described below.

Alternatively, if the source key still exists, the method may then depend upon whether the links associated with the source key in the skip list still point to the same target (block 608). In various embodiments, the links included in the source bucket may be examined to determined as part of the determination if the links point to the same target. If the links do not all point to the same target, then the target is unlatched and the hold on the source record is released (block 613). The method may continue from block 603 as described above.

Alternatively, if the links associated with the source key all point to the same target, then a successor to the source key in the target bucket is determined, and the latch on the source bucket is released (block 609). In various embodiments, the successor to the source key may be stored in an array, as described above, for later use. Once the latch on the source bucket has been released, the hold on the source record may then be released (block 610). The method may then conclude in block 611.

Figure 6:
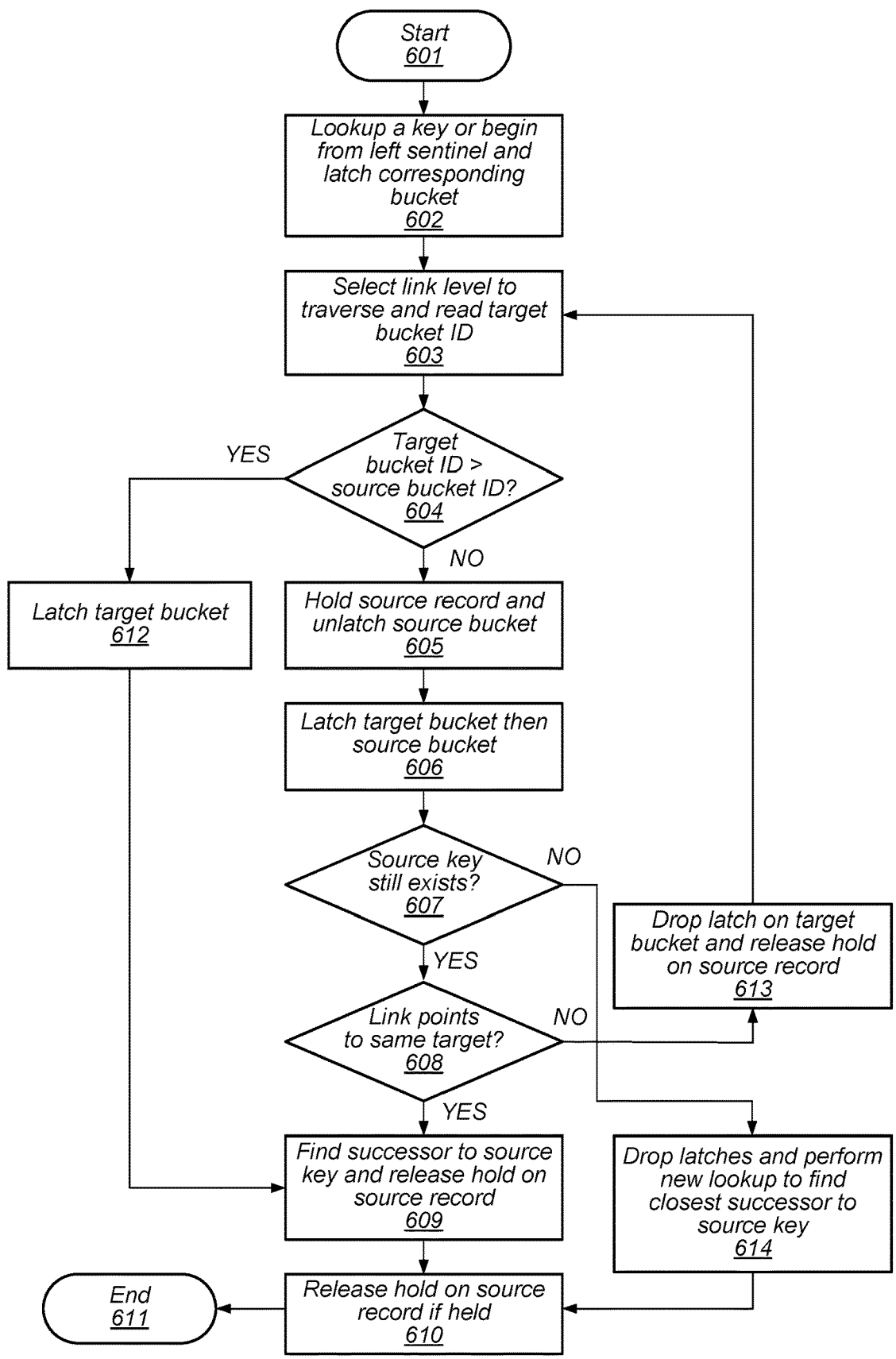
FIG. 6 is a flow diagram depicting an embodiment of a method for traversing a particular level of a skip list.

Although the operations included in the flow diagram of FIG. 6 are depicted as being performed in a sequential fashion, in other embodiments, one or more of the operations may be performed in parallel.

In the processing of database transactions, new keys and associated values may be stored into the data structure in buffer 105 as illustrated in FIG. 1. As part of inserting a new key-value pair, the skip list associated with the data records included in the data structure may be updated to reflect the new key. An embodiment of a method for inserting a new key into the skip list is depicted in the flow diagram of FIG. 7. In the following description of the method depicted in the flow diagram of FIG. 7, it is assumed that the skip list associated with the data structure in buffer 105 has been traversed using operations similar to those described in FIG. 4 through FIG. 6. The method begins in block 701.

The predecessor and successor arrays populated in block 504 of the method illustrated in FIG. 5 may then be sorted (block 702). In various embodiments, the arrays may be sorted according to the bucket identifier or any other suitable organizational metric. The buckets may then be latched, in order (block 703). In various embodiments, latching buckets in a specified order may avoid deadlatching. As noted above, when a particular bucket is latched, no modifications to the contents of the bucket may be modified.

For the key being inserted, the closest predecessor key in the predecessor bucket is determined (block 704), and for the identified predecessor key, the closest successor key may be found in the successor bucket (block 705). The operation then depends on whether the identified successor key is larger than the key being inserted (block 706). If the identified successor key is larger than the key being inserted, then a pair of adjacent keys has been found that span the inserted key, and the key may be inserted (block 707). In various embodiments, links in the predecessor and successor buckets may be updated as part of the insertion process. The method may then conclude in block 708.

Alternatively, if the successor key is not greater than the key being inserted, an appropriate location for inserting the new key has not been located, and a new lookup procedure may be initiated (block 709). In various embodiments, one or more operations included in the embodiments depicted in FIG. 4 through FIG. 6 may be repeated as part of the new lookup procedure. The method may then conclude in block 708.

Figure 7:
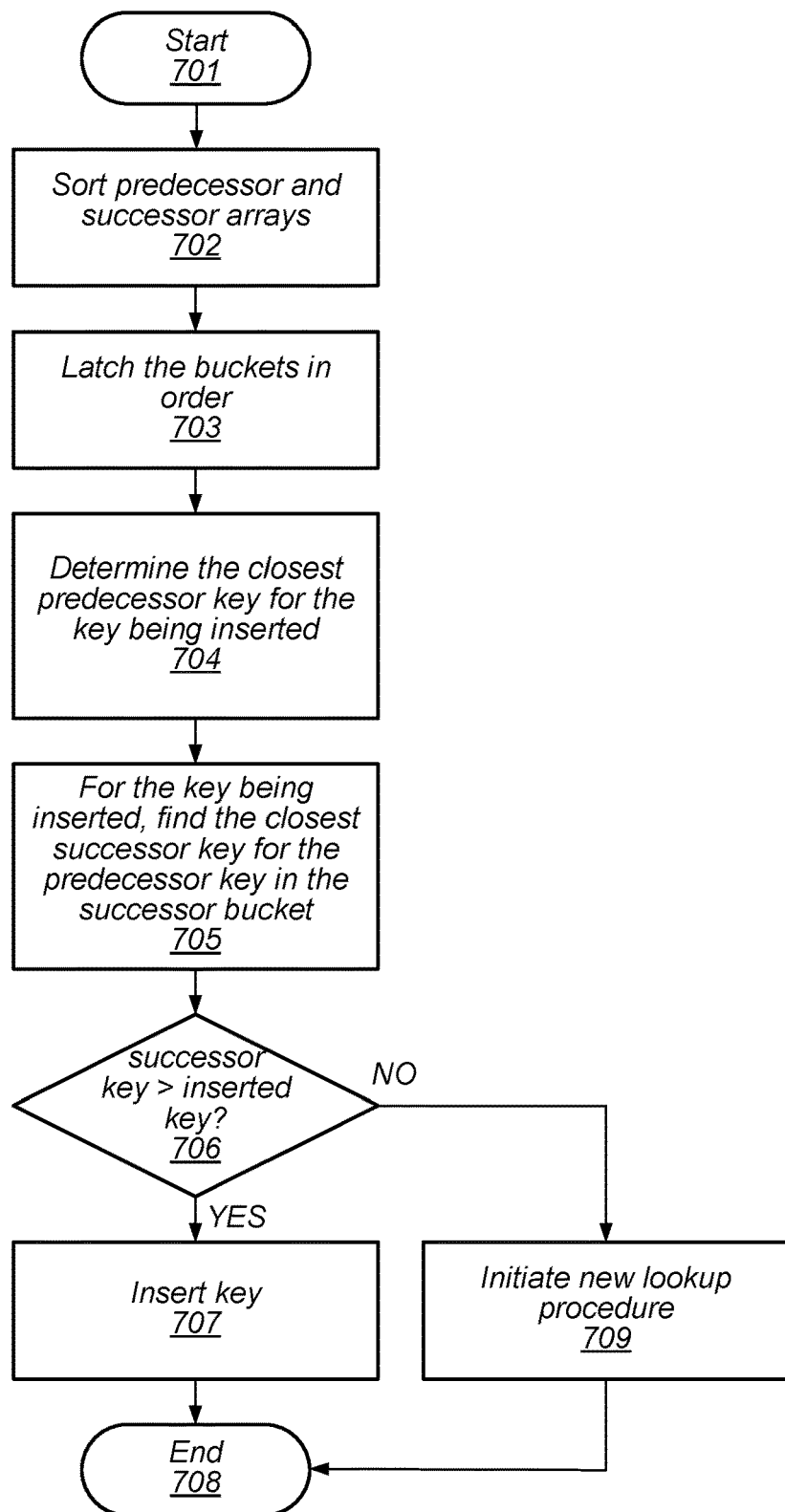
FIG. 7 is a diagram depicting an embodiment of a method for inserting a new key into a skip list data structure.

It is noted that the embodiment of the method illustrated in the flow diagram of FIG. 7 is merely an example. In other embodiments, different methods for updating the links in the skip list may be employed.

As mentioned above, processing database transactions may include the removed or deletion of a key-value pair previously stored in the data structure storing values for active database transactions. An embodiment of a method for removing a key is illustrated in the flow diagram of FIG. 8. In the following description of the method depicted in the flow diagram of FIG. 8, it is assumed that the skip list associated with the data structure in buffer 105 has been traversed using operations similar to those described in FIG. 4 through FIG. 6. The method begins in block 801.

The predecessor and successor arrays populated in block 504 of the method illustrated in FIG. 5 may then be sorted (block 802). In various embodiments, the arrays may be sorted according to the bucket identifier or any other suitable organizational metric. The buckets may then be latched, in order (block 803). As noted above, when a particular bucket is latched, no modifications to the contents of the bucket may be modified.

For the particular key that is to be removed, find, in the predecessor bucket, the closest predecessor key to the key to be removed (block 804). The operation may then depend on the status of the links associated with the predecessor key (block 805). If the lowest level skip list link associated with the predecessor key points to the bucket that includes the key to be removed, then the key may be removed (block 806). In various embodiments, one or more links included in the bucket associated with the predecessor key may be updated, as well as one or more links in a bucket associated with a successor key to the key being removed. The method may complete in block 807.

Alternatively, if the lowest level skip list link in the bucket associated with the predecessor key does not point to the key being removed, then a new lookup procedure may be initiated (block 808). In various embodiments, one or more operations included in the embodiments depicted in FIG. 4 through FIG. 6 may be repeated as part of the new lookup procedure. The method may then conclude in block 807.

Figure 8:
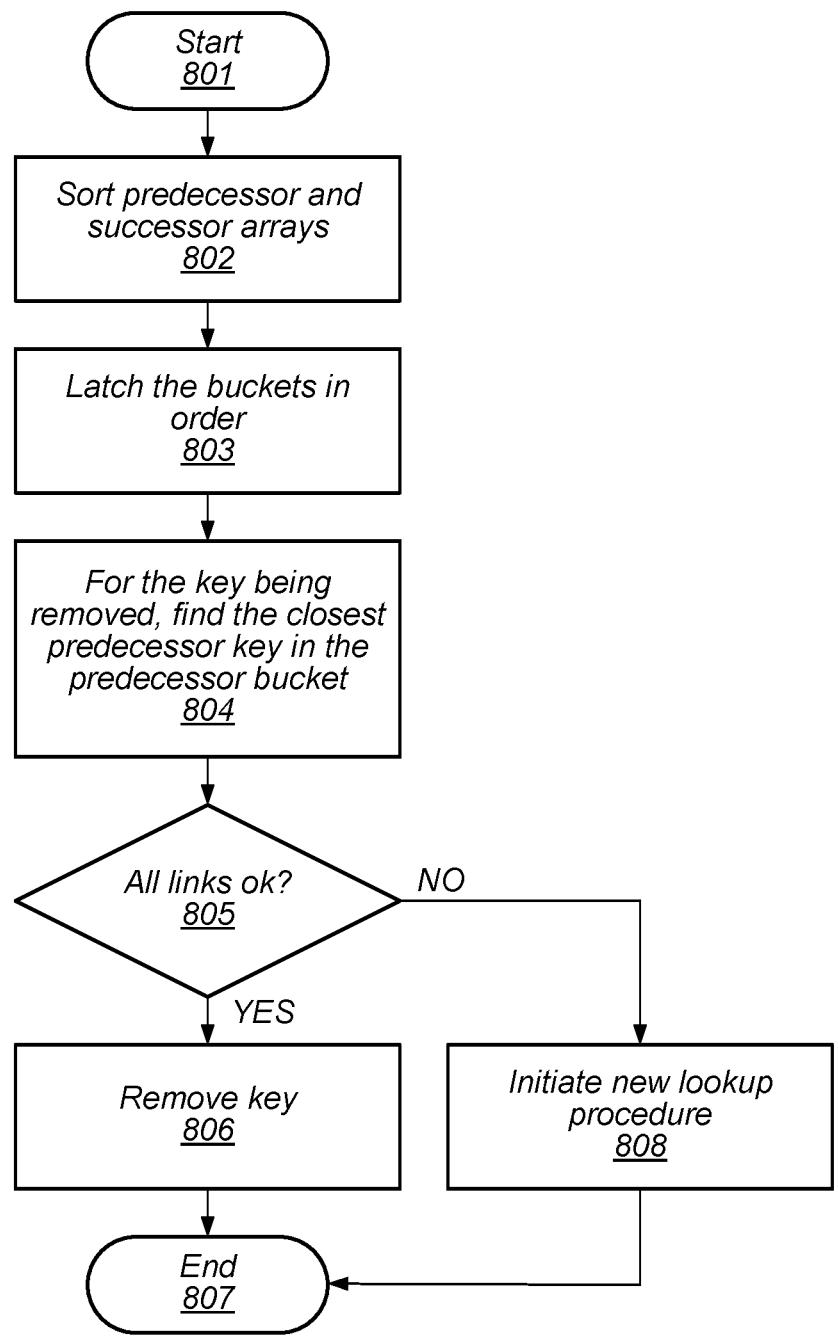
FIG. 8 is a diagram depicting an embodiment of a method for removing a key from a skip list data structure.

It is noted that the embodiment of the method depicted in the flow diagram of FIG. 8 is merely an example. In other embodiments, different operations and different orders of operations may be employed.

Figure 9:
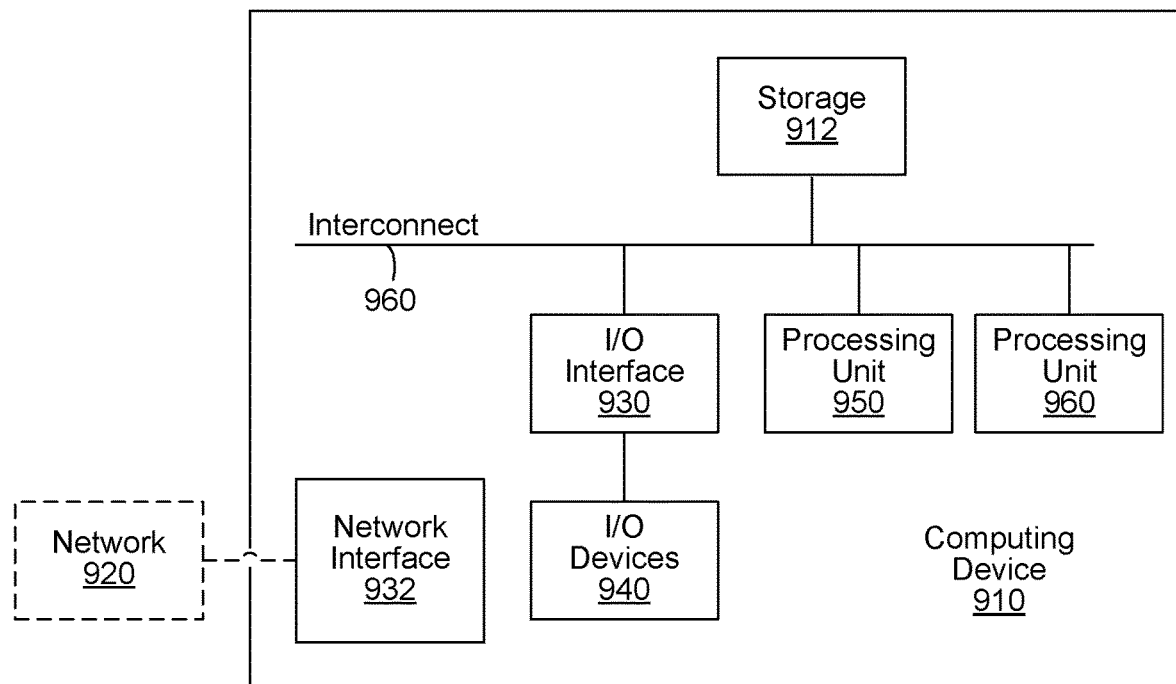
FIG. 9 is a block diagram illustrating a computing system, according to some embodiments.

Turning now to FIG. 9, a block diagram of a computing device (which may also be referred to as a computing system) 910 is depicted, according to some embodiments. Computing device 910 may be used to implement various portions of this disclosure. Computing device 910 is one example of a device that may be used as a mobile device, a server computing system, or any other computing system implementing portions of this disclosure. For example, computing device 910 may be a device that hosts the database server 104.

Computing device 910 may be any suitable type of device, including, but not limited to, a personal computer system, desktop computer, laptop or notebook computer, mobile phone, mainframe computer system, web server, workstation, or network computer. As shown, computing device 910 includes processing unit 950, storage subsystem 912, input/output (I/O) interface 930 coupled via interconnect 960 (e.g., a system bus). I/O interface 930 may be coupled to one or more I/O devices 940. Computing device 910 further includes network interface 932, which may be coupled to network 920 for communications with, for example, other computing devices. For example, the network 920 may be part of or all of the network 112 in FIG. 1.

The processing unit 950 may include one or more processors. In some embodiments, processing unit 950 includes one or more coprocessor units. In some embodiments, multiple instances of processing unit 950 may be coupled to interconnect 960. Processing unit 950 (or each processor within processing unit 950) may contain a cache or other form of on-board memory. In some embodiments, processing unit 950 may be implemented as a general-purpose processing unit, and in other embodiments it may be implemented as a special purpose processing unit (e.g., an ASIC). In general, computing device 910 is not limited to any particular type of processing unit or processor subsystem.

It is noted that the embodiment depicted in FIG. 9 is merely an example. In other embodiments, different components and different arrangements of components in computing device 910 are possible and contemplated.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 912 is usable by processing unit 950 (e.g., to store instructions executable by and data used by processing unit 950). Storage subsystem 912 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 912 may consist solely of volatile memory in some embodiments. Storage subsystem 912 may store program instructions executable by computing device 910 using processing unit 950, including program instructions executable to cause computing device 910 to implement the various techniques disclosed herein.

I/O interface 930 may represent one or more interfaces and may be any of various types of interfaces configured to couple to and communicate with other devices, according to various embodiments. In some embodiments, I/O interface 930 is a bridge chip from a front-side to one or more back-side buses. I/O interface 930 may be coupled to one or more I/O devices 940 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
maintaining, by a database system, a buffer that stores database records for database transactions that are each associated with a corresponding key, wherein the database records implement a skip list that allows for the database records to be accessed in key-sorted order, and wherein a particular database record stores, as part of the skip list, a hash bucket pointer to a particular one of a plurality of hash buckets that in turn indicates a memory location of a next database record in the buffer in key-sorted order relative to the particular database record;

receiving, by the database system, a first key of a first database transaction having a value stored in a first one of the database records;

hashing, by the database system, the first key to determine a first hash bucket from the plurality of hash buckets, wherein the first hash bucket includes a first pointer that enables access to the first database record storing the value associated with the first key;

accessing, by the database system, the first database record using the first pointer; and traversing, by the database system, the skip list from the first database record to access, in key-sorted order, a set of the database records stored in the buffer.

2. The method of claim 1, further comprising:

receiving, by the database system, a second key of a second database transaction, wherein the second key is associated with a second value;

hashing, by the database system, the second key to determine a second hash bucket from the plurality of hash buckets, wherein the second hash bucket includes a second pointer;

traversing, by the database system, the skip list using the second pointer; and inserting, by the database system, the second value into the skip list using results of traversing the skip list using the second pointer.

3. The method of claim 2, wherein inserting the second value includes determining, by the database system, an adjacent predecessor key of a plurality of keys and an adjacent successor key of the plurality of keys that span the second key.

4. The method of claim 1, further comprising locking, by the database system, the first bucket of the plurality of hash buckets to prevent updates to the first bucket.

5. The method of claim 1, wherein traversing the skip list includes:

populating a first array of predecessor bucket identifiers for the first key for each level included in the skip list, and populating a second array of successor bucket identifiers for the first key for each level included in the skip list.

6. The method of claim 1, wherein in response to a change in the memory location of the next database record in the buffer, the database system:

updating the particular hash bucket to indicate the changed memory location; and leaving the hash bucket pointer to the particular hash bucket unchanged in the particular database record.

7. A non-transitory computer-readable medium having computer instructions stored thereon that are capable of being executed by a database system to cause operations comprising:

maintaining a buffer that stores database records for database transactions that are each associated with a corresponding key, wherein the database records implement a skip list that allows for the database records to be accessed in key-sorted order, and wherein a particular database record stores, as part of the skip list, a hash bucket pointer to a particular one of a plurality of hash buckets that in turn indicates a memory location of a next database record in the buffer in key-sorted order relative to the particular database record;

receiving a first key of a first database transaction having a value stored in a first one of the database records, wherein each active database transaction is associated with a respective key of a plurality of keys;

hashing the first key to determine a first hash bucket from the plurality of hash buckets, wherein the first hash bucket includes a first pointer that enables access to the first database record storing the value associated with the first key;

accessing the first database record using the first pointer; and traversing the skip list from the first database record to access, in key-sorted order, a set of the database records stored in the buffer associated with the database system.

8. The non-transitory computer-readable medium of claim 7, wherein the operations further include updating one or more pointers of the plurality of hash buckets in response to removing the first database record from the buffer.

9. The non-transitory computer-readable medium of claim 7, wherein the operations further include:

receiving a second key of a second database transaction, wherein the second key is associated with a second value;

hashing the second key to determine a second hash bucket from the plurality of hash buckets, wherein the second hash bucket includes a second pointer;

traversing the skip list using the second pointer; and inserting the second value into the skip list using results of traversing the skip list using the second pointer.

10. The non-transitory computer-readable medium of claim 9, wherein inserting the second value includes determining, by the database system, an adjacent predecessor key of a plurality of keys and an adjacent successor key of the plurality of keys that span the second key.

11. The non-transitory computer-readable medium of claim 7, wherein the operations further include locking the first bucket of the plurality of hash buckets to prevent updates to the first bucket.

12. A method comprising:

receiving, at a database system, a first key of a first database transaction having a value stored in a data structure that stores a plurality of values for a corresponding plurality of active database transactions, wherein each active database transaction is associated with a respective key of a plurality of keys;

hashing the first key to determine a first hash bucket from a plurality of hash buckets, wherein the first hash bucket includes a first pointer that enables access to a skip list that maintains an ordering of the plurality of keys;

traversing, by the database system, the skip list by:

referencing, in a particular record included in the skip list, a hash bucket pointer to a particular bucket of the plurality of hash buckets, wherein the particular record is associated with a particular key of a plurality of keys, and wherein the particular bucket is associated with another key of the plurality of keys;

referencing, in the particular bucket, a second pointer to another record included in the skip list; and accessing, by the database system, the value in the data structure using results of traversing the skip list.

13. The method of claim 12, further comprising removing, by the database system, the value in the data structure using the results of traversing the skip list.

14. The method of claim 12, further comprising:
receiving, by the database system, a second key of a second database transaction, wherein the second key is associated with a second value;
traversing, by the database system, the skip list using the second key; and
inserting, by the database system, the second value into the data structure using results of traversing the skip list using the second key.

15. The method of claim 14, wherein inserting, by the database system, the second value into the data structure using the results of traversing the skip list using the second key includes determining, by the database system, a predecessor key and an adjacent successor key that span the second key.

* * * * *